March 1, 1938.  T. A. HUTSELL  2,110,043
BEER DISPENSING APPARATUS
Filed Jan. 26, 1935  5 Sheets-Sheet 2

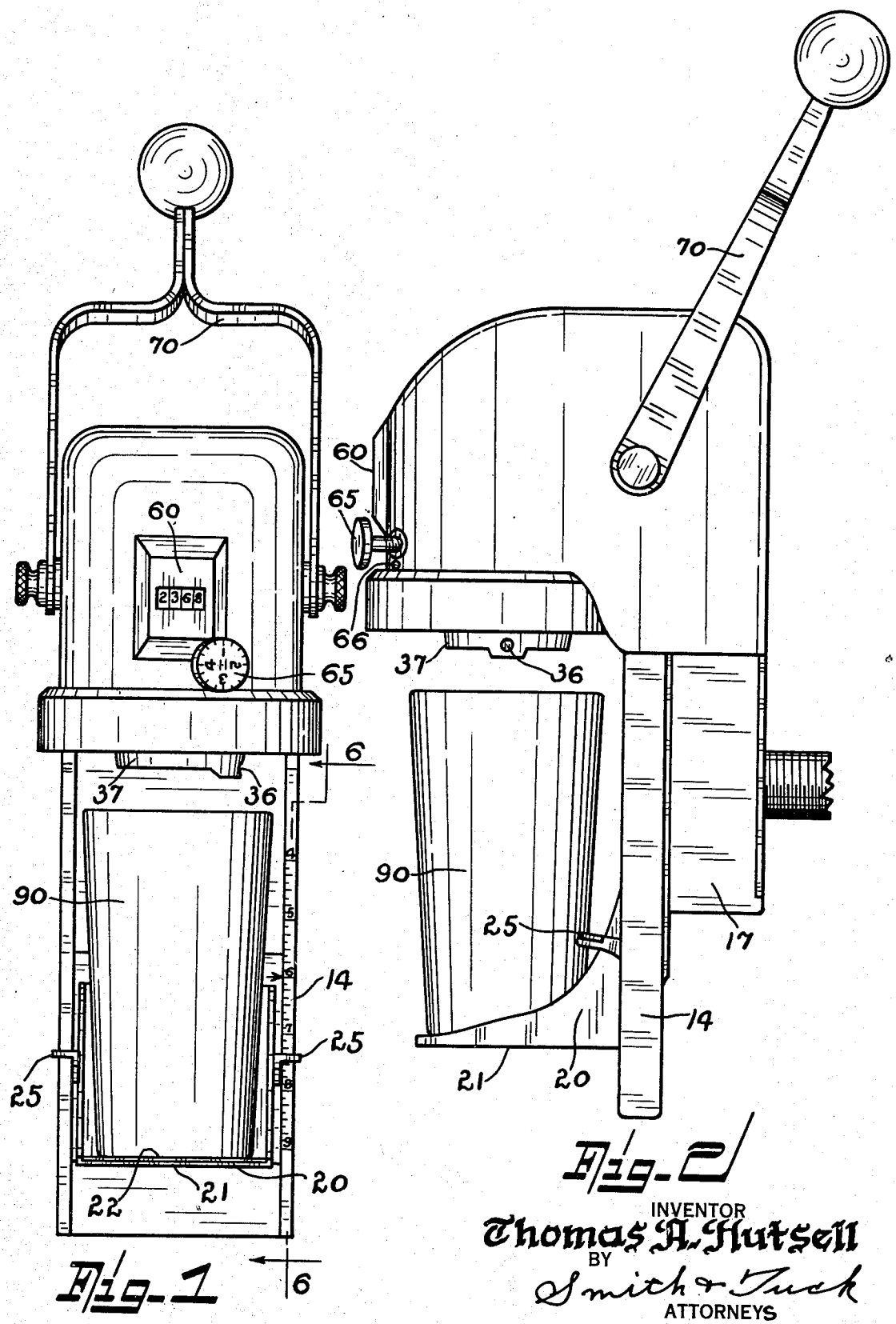

INVENTOR
Thomas A. Hutsell
BY
Smith + Tuck
ATTORNEYS

March 1, 1938. T. A. HUTSELL 2,110,043
BEER DISPENSING APPARATUS
Filed Jan. 26, 1935 5 Sheets-Sheet 3

INVENTOR
Thomas A. Hutsell
BY
Smith & Tuck
ATTORNEYS

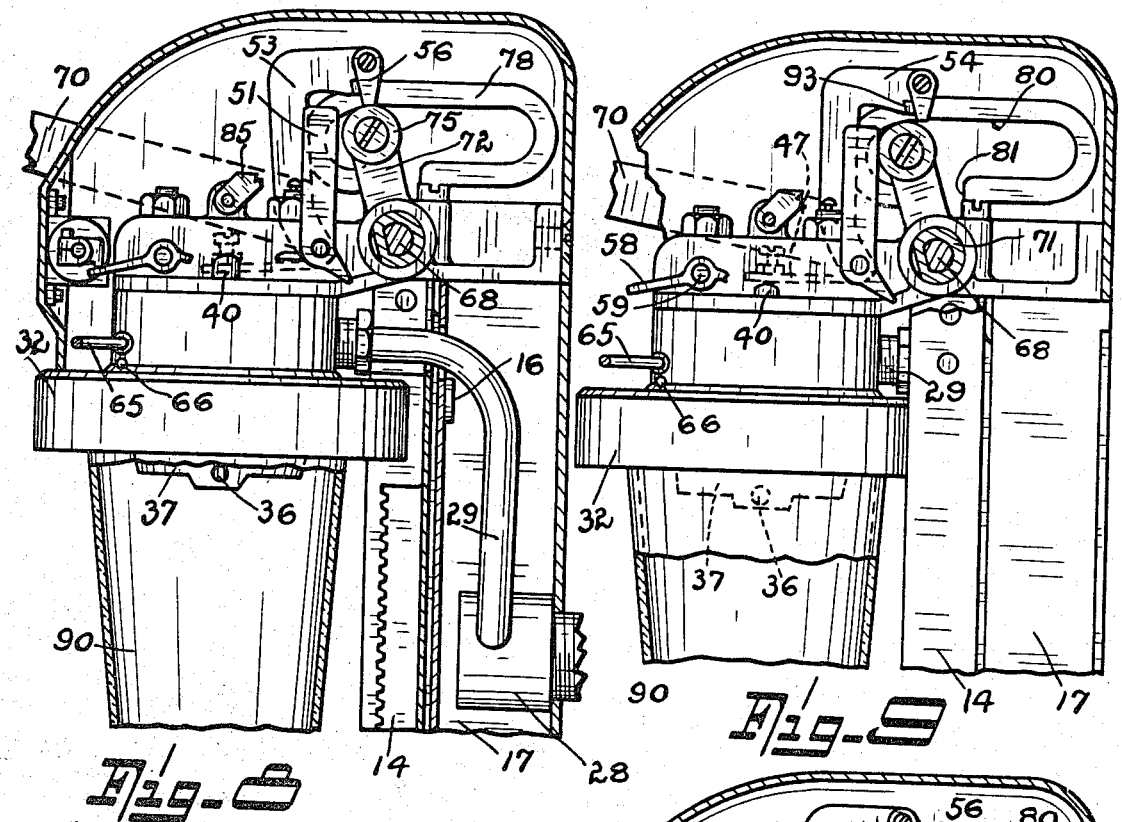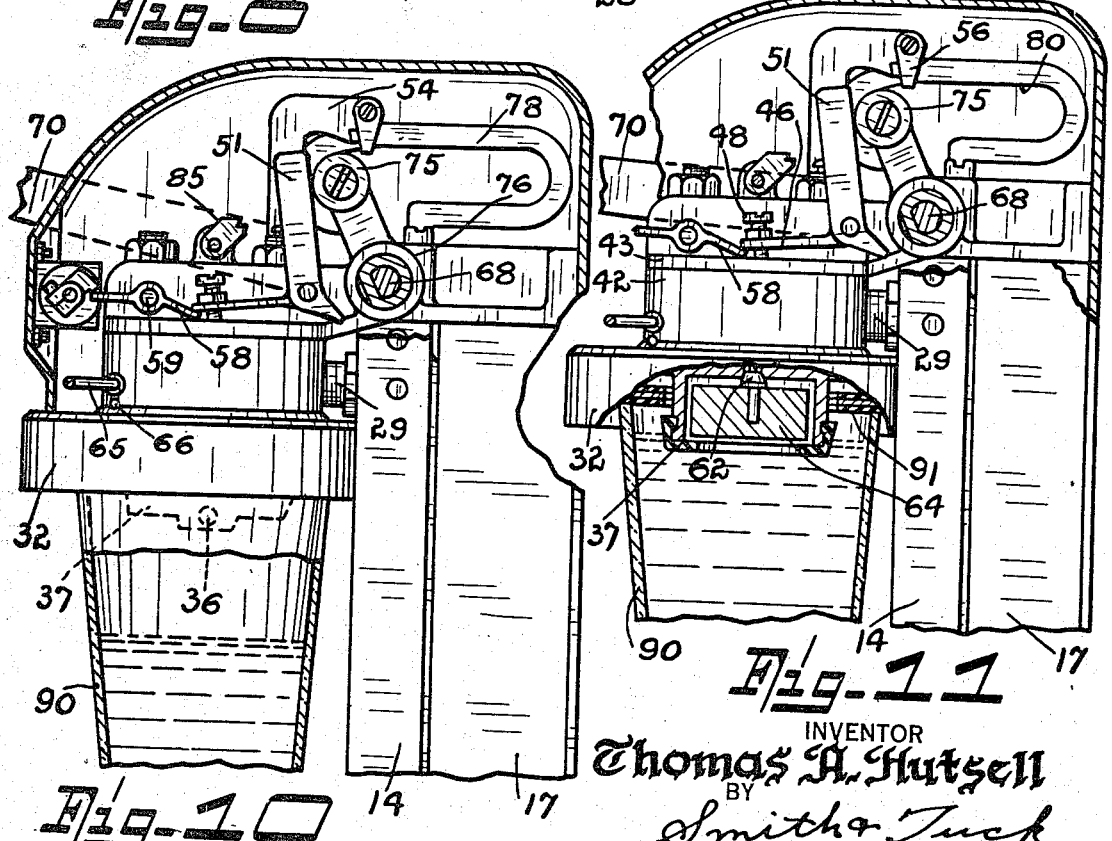

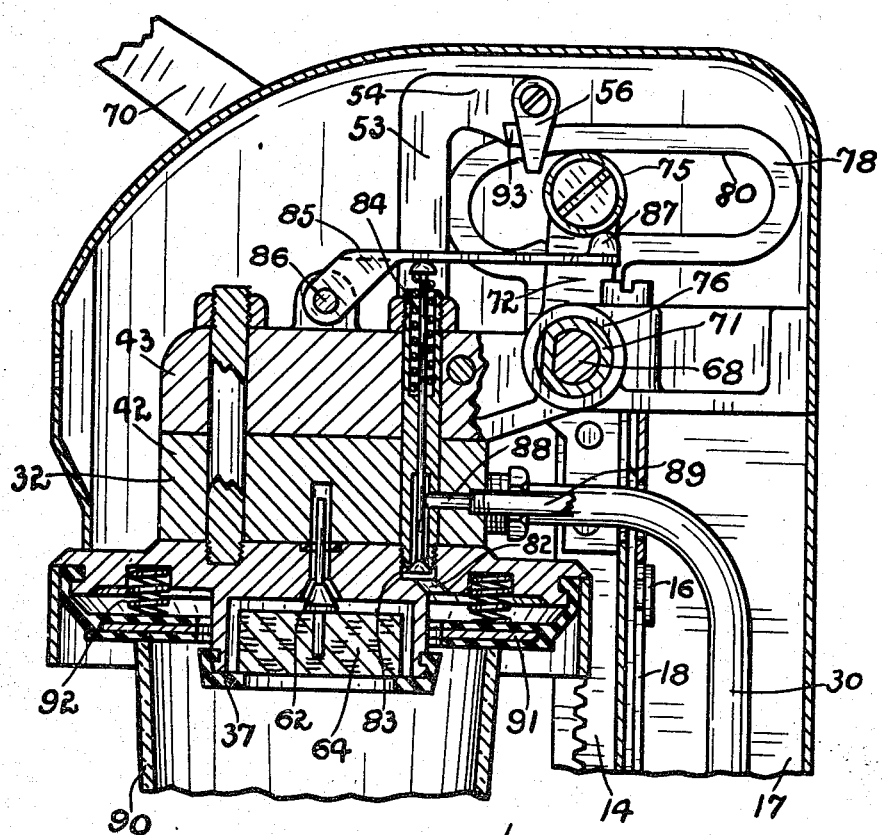
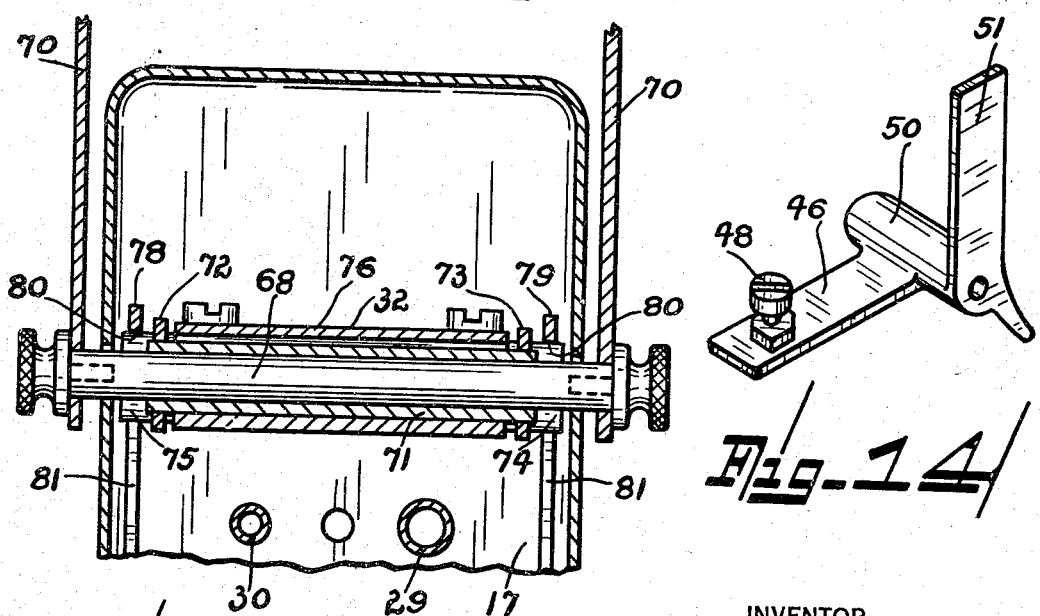

Patented Mar. 1, 1938

2,110,043

UNITED STATES PATENT OFFICE 2,110,043

BEER DISPENSING APPARATUS

Thomas A. Hutsell, Seattle, Wash.

Application January 26, 1935, Serial No. 3,660

4 Claims. (Cl. 225—8)

My present invention relates to a beer dispensing apparatus.

The accurate measuring and proper handling of gas-charged liquids has long been a perplexing problem. There are many liquids which it becomes necessary to measure accurately but which, because of their gas content, effervesce or foam and interfere with the accurate measurement of the same. One of the most outstanding of this class of liquids is beer, used as a beverage. In the past, when dispensing beer at a bar, it has been customary to draw the liquid into a glass, then when an estimated amount had been drawn in, the liquid was allowed to come to rest. The amount of foam then formed was the function, largely, of the character of the beer itself, and varied from time to time. If the judgment of the bartender was not correct the glass was either short in measurement, or an excess was provided which would run over the rim of the glass and be wasted. A further waste is occasioned by the necessity of wiping off the top of the glass, usually with a stick and then wiping off the outside of the glass, as with a cloth, before offering the beverage to customers. This system has been either wasteful or did not give the customer full measure. It also slowed up the dispensing of beer and over-run glasses required additional time for cleaning the outside, if the beer was to be presented in an appetizing manner. It is further well known that there is a definite relationship between the amount of gas, as for instance carbon dioxide, that beer will retain in solution and the temperature of the same, the lower the temperature the less tendency to liberate the contained gas. Now, quite often it is not possible for the retailer of such beverages to keep his keg, or barrels of beer, at sufficiently low a temperature to retain the gases in solution. With the usual type of dispensing means it is therefore necessary in such cases to relieve the pressure thus created and a large proportion of the gas is thus lost. Under such conditions it is quite common for the lower portion of the keg to have lost such a large percentage of the included gas as to become what is commonly known as stale, or flat. With my present device it is possible to dispense beer under absolute control even though the temperature or pressure may be higher than that commonly met in practice. This means that the included gas is not lost and the beer is thus delivered to the consumer in the same condition as when it left the brewery.

Further, I provide means which will accurately measure the desired amount of beer in a glass, or container, in its natural state without any foam being formed, then by suitable means the desired amount of foam may be produced from the measured quantity of beer in the customer's container, or glass. This characteristic makes it possible for my device to accurately measure the beverage so that each customer has the positive assurance that he is getting full measure paid for, then from the standpoint of appearance the desired amount of foam can be produced from that measured quantity of beer, with the assurance that a uniform head can be provided on each glass and, further, that this head can be varied according to the will of the operator by merely making a slight adjustment in the device. I further have provided means which will enable my device to deposit the beverage, or whatever liquid is so measured, into the service container, or glass. Further, my device provides for a large range of container capacities and shapes. My present device further provides that the operator need merely operate the control handle and the beer, or other liquid, will be automatically measured and recorded by the device, so that at the end of the day the number of servings will be a matter of record.

Other and more specific objects will be apparent from the following description taken in connection with the accompanying drawings, wherein Figure 1 is a front elevation of a dispenser made after the teachings of my invention.

Figure 2 is a side elevation of the same.

Figures 8, 9, 10 and 11 are fragmentary views showing the sequence of operation of my dispensing device.

Figure 12 is a cross-sectional view taken along the line 12—12 of Figure 4.

Figure 13 is a cross-sectional view taken along the line 13—13 of Figure 3.

Figure 14 is a perspective view showing the crank arm used for opening my beer dispensing valve.

Figure 3:
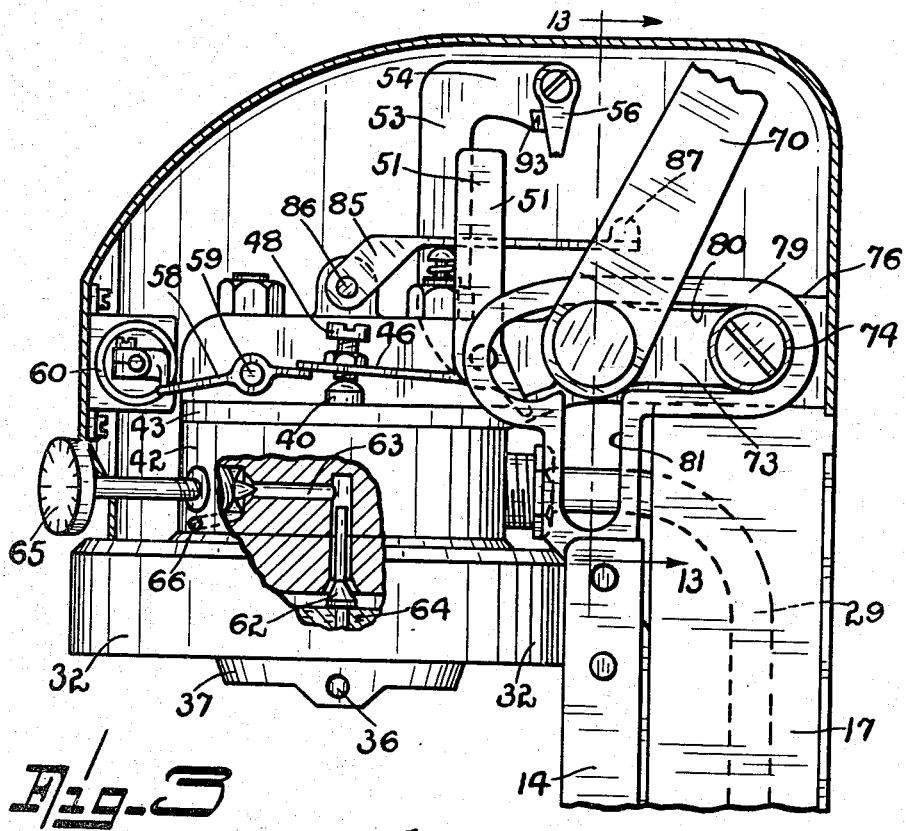
Figure 3 is a fragmentary elevation of the head of my device, certain parts being shown in section to better illustrate its construction.
Figure 4:
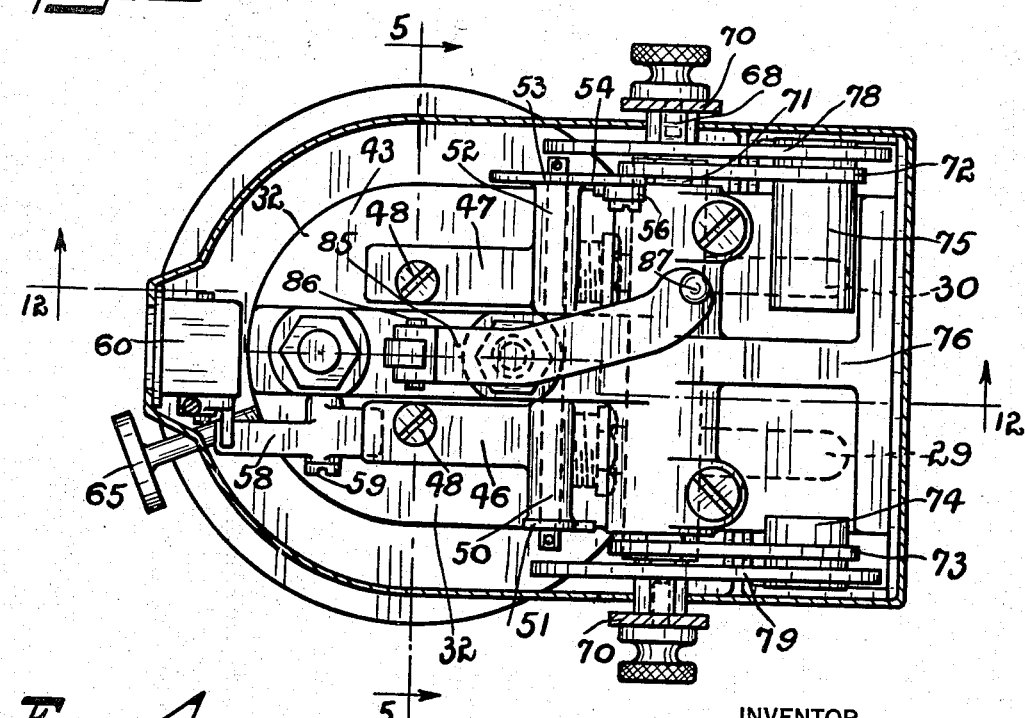
Figure 4 is a top plan view of my device with the enclosing cover broken away and shown in section.

Referring to the drawings, throughout which like reference characters indicate like parts, 14 designates the supporting frame of my device. This I prefer to form of pressed metal in that maximum rigidity for a given weight can thus be obtained. This is provided with a plurality of headed studs 16 which are adapted to engage a fixed support 17 by some suitable means, as the bayonet slots 18, thus permitting easy removal of the device from the fixed support.

Figure 6:
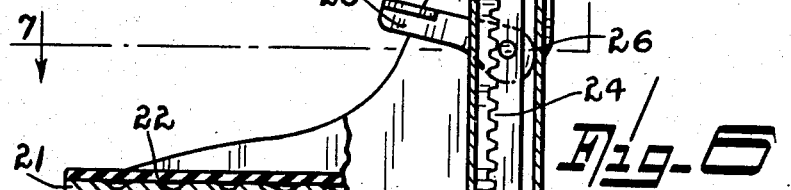
Figure 6 is a fragmentary cross-sectional view taken substantially along the line 6—6 of Figure 1.
Figure 7:
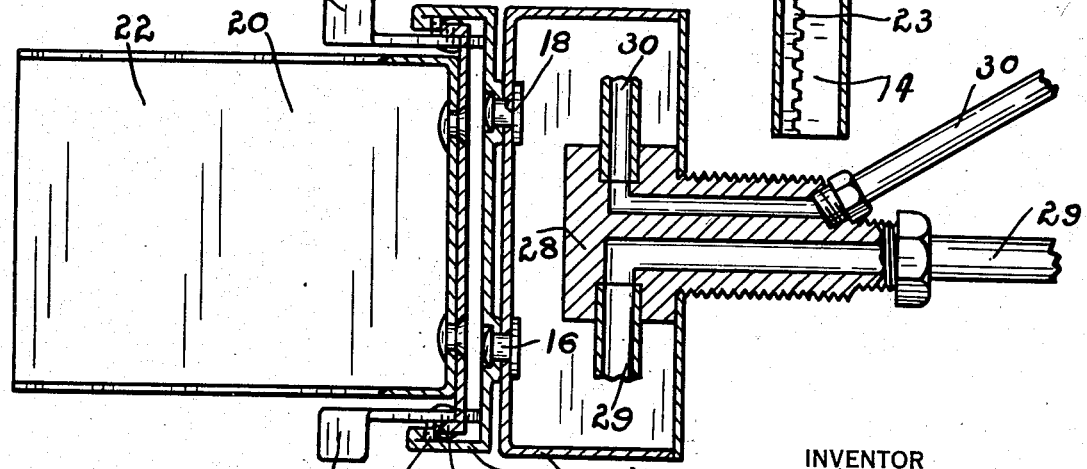
Figure 7 is a cross-sectional view taken along line 7—7 of Figure 6.

Suitably secured to frame 14 is the adjustable glass carriage 20. This is provided with a glass support bracket 21, preferably covered with some resilient material 22. Frame 14 is further provided with a plurality of teeth 23, which may take the form of a rack, or ratchet teeth. Adapted to engage the teeth, for adjustment purposes, is a rack of similar tooth form 24. Rack 24 is fixedly secured to carriage 20 and may be locked in engagement with rack 23 by means of the eccentric pawl lever 25. The same is shown in its locked position in Figure 6 in which rack 24 engages rack 23 and is held in that engaged position by the eccentric portion 26 of lever 25 abutting the back of frame 14. It will be apparent, it is believed, that raising up on lever 25 will withdraw rack 24 from engagement with rack 23 and permit adjustment of bracket 21 with respect to the movable frame 14.

Passing through an opening in the fixed frame 17 is the distributor head 28. This head accommodates the beer supply line 29 and the gas supply line 30. Different types of beverages or other liquids might require different gases, for beer carbon dioxide is probably the most desirable, yet air is normally used because of the cost of other gases. Lines 29 and 30 lead to the fixed head of my device. This head is referred to generally by the reference character 32. It houses a plurality of units each of which performs a definite function in the measuring and dispensing cycle.

Figure 5:
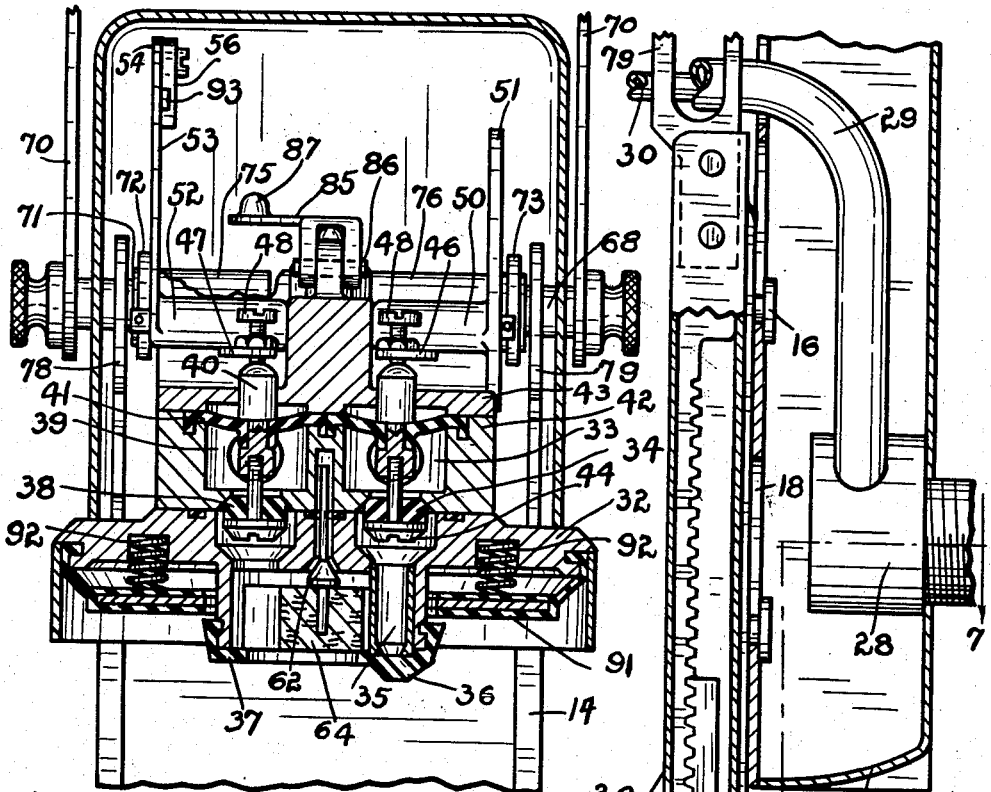
Figure 5 is a fragmentary-sectional view taken along the line 5—5 of Figure 4.

Referring particularly to Figures 3, 5 and 12: The beer supply line communicates with chamber 33 below which is positioned a valve 34 which, when opened, permits the flow of beer down through bore 35 and out through orifice 36. Orifice 36 is formed in a slip-on cap member 37. I have found it most desirable to make this of resilient material so that the cap may be quickly and conveniently changed. This is desirable when appreciable wear or deterioration occurs but, more particularly when it is desired to change the air space in the top of the glass, after it is filled with beer. It will naturally follow that the greater the mass of cap 37 the less will be the space available for air and foam when a glass of beer is drawn. Disposed adjacent valve 34 is the gas valve 38 which, when opened, admits gas from chamber 39 and, in turn, from tube 30 into the glass or dispensing chamber. The manner of operating these valves, however, is identical. It consists of an enlarged valve stem 40 which is secured in a rubber disc 41. The disc, in turn being seated between members 42 and 43 of the head proper and prevents any leakage around the valve stem. The discs 41 tend to normally close valves 34 and 38 and are so arranged that they are under a certain degree of tension when the valve is closed, substantially as indicated in Figure 5. The seating force on valves 34 and 38 is further augmented by the fluid pressure of the beer and gas, respectively, which normally fill chambers 33 and 39. The enlarged valve stem 40 is adapted to receive the metal portion 44 of the valve. Each of the valves is mechanically operated at the desired time in the dispensing cycle by means of levers 46 and 47 which, as a matter of convenience, are provided with an adjustable contact 48 so that the degree of opening can be adjusted.

The operating means for the levers will best be understood by a study of Figures 3, 4, 5 and 14. Lever 46 is fixedly secured to, or formed as a part of, a bell crank having a hub portion 50, and an upwardly extending lever 51 which is operated to introduce the beer to the glass, or container. Lever 47 is part of the bell crank having the hub portion 52 and the upwardly extending arm 53. Lever 53 has a sidewardly extending portion 54 to which is pivotably secured pawl member 56. This assembly controls the introduction of gas into the glass, or container.

Lever 46 further serves to actuate lever 58 which is pivotably supported at 59. It serves to actuate the tabulator 60 so that each complete cycle of the dispenser will be recorded.

To stop the inflow of liquid, when it has reached the desired upward extent, I provide a check valve 62. This valve is adapted to close a vent or release passageway 63. Valve 62 is mounted in a light float, in the illustrations I have indicated a cork float 64, so that when the level of the liquid has raised sufficiently to float 64 it will seal the valve 62 by carrying the same upwardly to its seat in head 32. The gas flow through passageway 63 is adjustably controlled by a needle valve 65 so arranged that it obstructs passageway 63 and may be adjusted at extremes, so as to either close it or open it fully. The external discharge of passage 63 is indicated at 66. For convenience it has been found desirable to graduate the finger knob of valve 65.

Levers 51 and 53 which, in turn, operate valves 34 and 38, respectively, are operated by means shown in its operating cycle in Figures 8, 9, 10 and 11. A through shaft 68 is provided which is flattened or otherwise deformed so as to provide a secure non-rotatable engagement with the forked operating handle 70. Encircling shaft 68 is a hollow shaft 71 which is deformed in a manner to prevent rotation on shaft 68. Secured by the tube deformation, on each of its ends, are two arms 72 and 73, respectively. Arm 73 carries a relatively short cylinder at its extreme end, as 74, whereas arm 72 carries a longer cylinder 75. The upper casting 76 of the head assembly forms the supporting means for the head and also the journal for shaft 68 and the encircling tube 71.

Disposed over each end of shaft 68, but in a manner to at all times clear the same, are slot cam members 78 and 79 each having a slot 80. These members are fixedly secured to frame 14 and serve as a connecting means between the glass support assembly and the operating cylinders, or cranks, 73 and 75 which are positioned within slots 80. A downwardly extending slot 81 is provided enabling the slot cam members to straddle shaft 68 and also provides a bearing for the same against transverse displacement when the slot cams are in their upward positions.

Referring to Figure 12 reference is had to a vent 82 which, normally, is closed by valve 83 and is held in its closed position by compression spring 84. As an operating means therefor I provide lever 85 pivoted at 86 and adapted to be engaged by the end of the long crank member 75, after the showing of Figure 12. A raised contact lug 87 is provided so that the period of depression of lever 85 will be of but short duration and easily timed. When lever 85 depresses valve 83 a venting is provided through vent 82 out through orifice 88 to which, if desired, a pipe 89 may be secured. The purpose of this vent is to carry away the air exhaust and any excess foam which might be created within the measuring chamber, or glass, 90.

Method of operation

In operating my device the dispensing glass, or vessel, 90, is placed upon tray 21 with lever 70 in the position indicated in Figure 2. The next operation is to draw the ball handle of lever 70 toward the operator, or toward the left as shown in Figure 2. The head mechanism is in the position indicated in Figure 3, with the slotted cam members 80 at their lowest position. As shaft 68 is revolved by action of handle 70, cranks 72 and 73 raise cylinders 74 and 75, after the principles of cam followers, to engage the upper surface of slot 80. This raises the glass and glass supporting assembly upwardly, guided by studs 16, until the glass contacts the resiliently supported disc 91. This disc is preferably a metal disc encased in rubber, after the showings, particularly, of Figures 5 and 12. Resiliency is further provided by a plurality of coil compression springs 92 which tend to hold disc 91 away from head 32. The upward movement of the glass, however, compresses the springs and, when the cylinders 74 and 75 are at the zenith of their movement, after the showing of Figure 12, the glass is securely held in an air tight manner against plate 91. A further movement of the handle causes cylinder 75 to engage lug 56. While lug 56 is pivoted to arm 54 it is held against movement to the left by stop 93. This causes a displacement of arm 53 and, through the mechanism connected thereto, causes an opening of valve 38. This admits to glass 90, gas under pressure. Inasmuch as the area of plate 91 is considerably greater than the glass it rests upon the incoming gas, operating upon the upper side of plate 91, tends to further seal the top of the glass. This pressure must be a pressure somewhat lower than the pressure upon the beer which will later be introduced into the glass. This pressure is normally dependent upon temperatures, it being well known that the lower the temperature the more easily is the included gas retained in the liquid. The actual pressure is, normally, somewhere between 5 and 35 pounds per square inch. The differential between the gas and beer pressures need not, normally, be very great, two or three pounds sufficing, an increase in this differential causing the beer to come into the chamber faster and its decrease to retard the flow somewhat, until if the pressures were equal there would be no flow. Where outside pressure is applied to the keg this same pressure may be applied to the container and the differential in pressure, or drop, below the beer pressure is provided by the controlled gas escape past valve 62.

The next step is illustrated in Figure 9 wherein cylinder 75 has begun to decline and so avoid further contact with pawl 56. This closes the air or gas line. A continuation of the handle movement causes cylinder 74 which is coaxially disposed at all times with cylinder 75, to engage lever 51. This action acting through lever 46 opens the beer valve and the beer continues to run into the glass as long as the handle is held in this position, until the glass is filled.

During the introduction of the beer the air or gas displaced by the beer, is driven out through passage 63 past valve 62 and needle valve 65. As indicated in Figure 3, the flow of fluid through the passage 63 may be controlled by turning the needle valve to close or to open communication with the opening 66, or this valve may be turned to only partially close communication with opening 66, as desired, or as found necessary by the operator. In some instances the opening 66 may communicate with a closed chamber to which excess pressure of gas may pass from passage 63, to be conserved for future use. However, as the glass becomes filled the buoyancy of float 64 carries valve 62 upwardly until the vent is closed. With the vent closed the pressure soon builds up in the glass so that no more beer can flow into the same.

It is desired to point out that the control of this escaping gas, considering the differential in pressure between the gas and beer lines to remain constant, controls the rate at which the beer is deposited into the glass. In other words it determines the turbulence of the beer and this determines the amount of foam that will be produced on the beer when the same is subjected to atmospheric pressure.

Assuming the glass to be filled with beer and the further flow arrested it is desirable to relieve the pressure in the glass before opening the glass to atmospheric pressure; I provide a satisfactory method by having cylinder 75 in its return movement contact lug 87 thus opening valve 83 and permitting the pressure within the glass to be relieved, as out through tube 89. A continued movement of handle 70 lowers the glass away from plate 91 returning it to the position shown in Figure 2 where the beer is ready for serving.

The foregoing description and the accompanying drawings are believed to clearly disclose a preferred embodiment of my invention but it will be understood that this disclosure is merely illustrative and that such changes in the invention may be made as are fairly within the scope and spirit of the following claims.

I claim:

1. The combination in a liquid dispensing apparatus with a head, dispensing means in the head and an operating lever therefor, a discharge nozzle rigid with the lower exterior face of the head, a sealing plate surrounding the nozzle and having a resilient mounting on said face, and an upright support, of a vertically reciprocable frame mounted on the support, a holder disposed beneath the nozzle and laterally of the frame, and co-acting means including a crank arm operable with the lever and a slotted portion of the frame for lifting said holder and a container carried thereby to close the mouth of the container against the sealing plate.

2. The combination in a liquid dispensing apparatus with a head and its support, dispensing means in said head, and an operating lever for said means, of a vertically reciprocable frame mounted on the support and rack teeth on said frame, a rack bar associated with the frame for engagement with said teeth, a cam locking lever pivoted on the rack bar for engagement with the frame to engage the rack bar and rack teeth, and co-acting means on the lever and frame for elevating the frame and a holder carried by the rack bar.

3. The combination in a liquid dispensing apparatus with a head and its support, dispensing means in the head, an operating lever, and spaced crank arms rotatable with the lever, of a vertically reciprocable frame having slots for co-action with said crank arms and mounted on the support, an auxiliary support including a holder mounted on the frame, and co-acting means on the auxiliary support and frame for locking the former on the latter.

4. The combination in a liquid dispensing apparatus with a head and its support, dispensing means in the head, an operating lever and spaced crank arms rotatable with the lever, of a vertically reciprocable frame having slots for co-action with said crank arms and mounted on the support, said frame having vertically spaced rack teeth, an auxiliary support having rack bars for engagement with said rack teeth, and a cam locking lever pivoted on the auxiliary support for engagement with the frame.

THOMAS A. HUTSELL.